(12) United States Patent
Kabanov et al.

(10) Patent No.: US 12,448,475 B2
(45) Date of Patent: Oct. 21, 2025

(54) DRUG DELIVERY COMPOSITIONS AND APPLICATIONS THEREOF

(71) Applicant: The University of North Carolina at Chapel Hill, Chapel Hill, NC (US)

(72) Inventors: Alexander Kabanov, Chapel Hill, NC (US); Duhyeong Hwang, Chapel Hill, NC (US); Marina Sokolsky, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 797 days.

(21) Appl. No.: 17/620,800

(22) PCT Filed: Jun. 19, 2020

(86) PCT No.: PCT/US2020/038711
§ 371 (c)(1),
(2) Date: Dec. 20, 2021

(87) PCT Pub. No.: WO2020/257635
PCT Pub. Date: Dec. 24, 2020

(65) Prior Publication Data
US 2022/0356287 A1 Nov. 10, 2022

Related U.S. Application Data

(60) Provisional application No. 62/864,643, filed on Jun. 21, 2019.

(51) Int. Cl.
| | | |
|---|---|---|
| *A61K 47/34* | (2017.01) | |
| *A61K 9/107* | (2006.01) | |
| *C08F 20/54* | (2006.01) | |
| *C08F 277/00* | (2006.01) | |

(52) U.S. Cl.
CPC ............ *C08F 277/00* (2013.01); *A61K 9/107* (2013.01); *A61K 47/34* (2013.01); *C08F 20/54* (2013.01)

(58) Field of Classification Search
CPC .... A61K 31/506; A61K 31/437; A61K 9/107; A61K 47/34; C08G 73/0233
See application file for complete search history.

(56) References Cited

U.S. PATENT DOCUMENTS

| | | |
|---|---|---|
| 2010/0249368 A1 | 9/2010 | Harris et al. |
| 2013/0017166 A1 | 1/2013 | Kabanov et al. |
| 2014/0141375 A1* | 5/2014 | Cho .................. G03F 7/038 |
| | | 430/296 |
| 2019/0054186 A1 | 2/2019 | Kabanov et al. |

OTHER PUBLICATIONS

Hill et al Alternating Radical Ring-Opening Polymerization of Cyclic KeteneAcetals: Access to Tunable and Functional Polyester Copolymers, Macromolecules 2018, 51, 5079-5084, published on Jul. 3, 2018.*
Cesana et al First Poly(2-oxazoline)s with Pendant Amino Groups, Macromol. Chem. Phys. 2006, 207, 183-192, published on Feb. 2006.*
Ivanova et al Micellar Structures of Hydrophilic/Lipophilic and Hydrophilic/Fluorophilic Poly(2-oxazoline) Diblock Copolymers in Water, Macromol. Chem. Phys. 2008, 209, 2248-2258, published on Oct. 2008.*
International Search Report and Written Opinion corresponding to PCT/US2020/038711, mailed Sep. 28, 2020, 11 pages.
Bouten P. J. M. et al., Thermal properties of methyl ester-containing poly(2-oxazoline)s, Polymers, Oct. 13, 2015 (13.10.20•15), vol. 7, issue 10, retrieved from the Internet: < DOI:10.3390/polym 7101494 >, pp. 1998-2008; see entire document.
Kelarev V. I. et al., Synthesis and properties of sym-triazine derivatives. 7. Synthesis of pyridyl-substituted 2-amino- and 2,4-diamino-sym-triazines, Chemistry of Heterocyclic Compounds, 1988, vol. 24, issue 5, pp. 550-555; retrieved from the Internet:< DOI:10. 1007/bf00755698 >,see entire document.

* cited by examiner

*Primary Examiner* — Gregory Listvoyb
(74) *Attorney, Agent, or Firm* — J. Clinton Wimbish; Maynard Nexsen PC

(57) ABSTRACT

In one aspect, amphiphilic block copolymers are described herein comprising a first block and a second block, the second block including monomer having a side chain comprising a heteroaryl moiety, wherein the second block is more hydrophobic than the first block. In some embodiments, the heteroaryl moiety is a five-membered ring or six membered ring. Amphiphilic block copolymers described herein, in some embodiments, can be used to form micellar compositions for solubilizing and delivering water insoluble pharmaceutical and/or therapeutic agents.

20 Claims, 10 Drawing Sheets

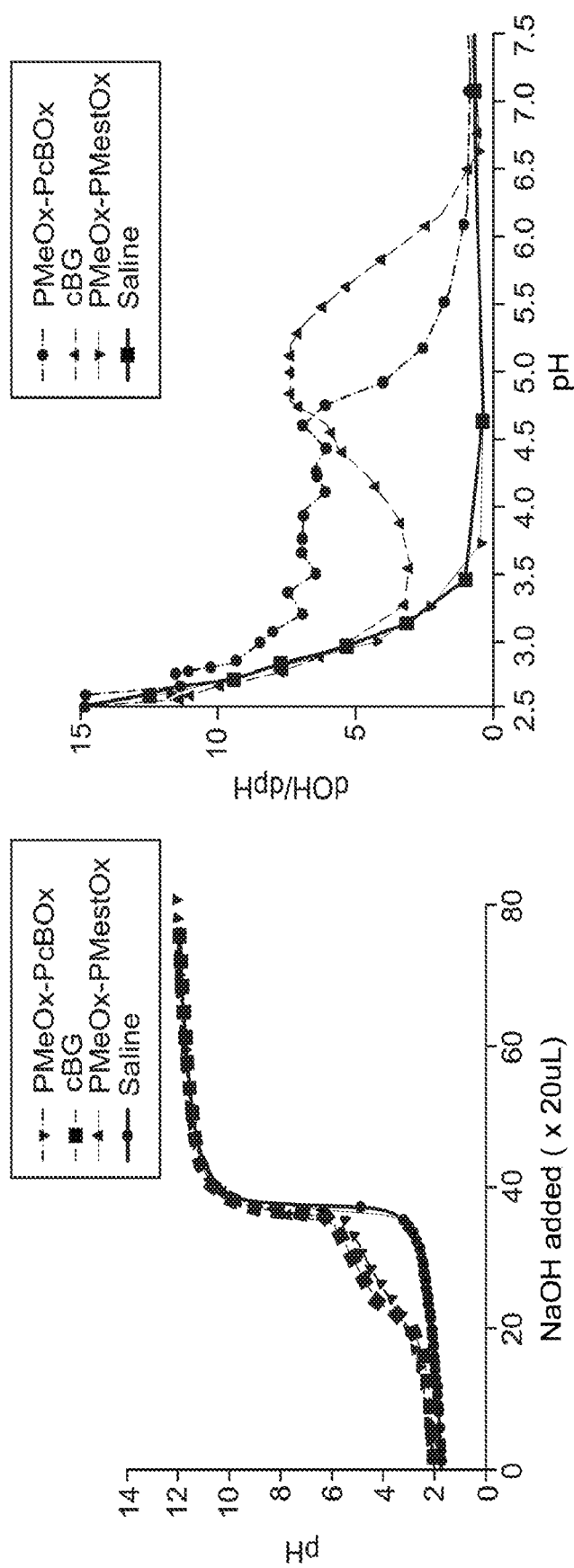
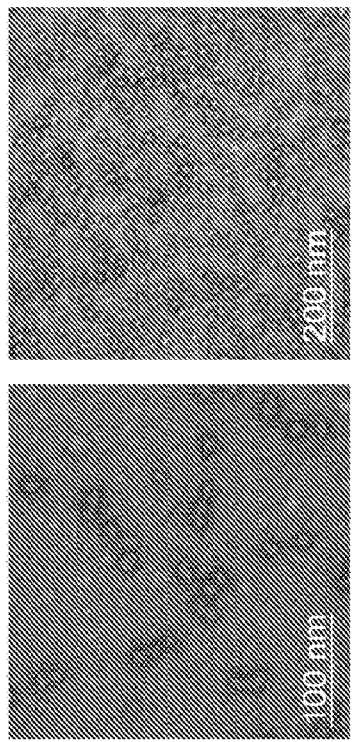
FIG. 3B
FIG. 3C

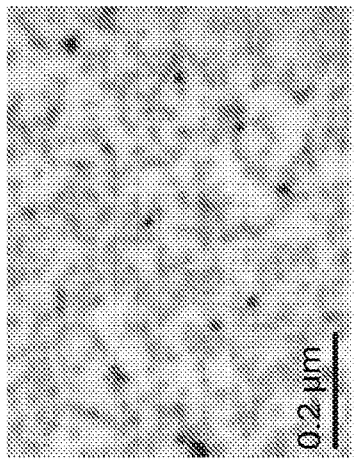
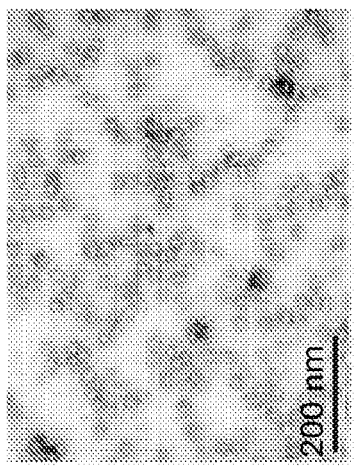
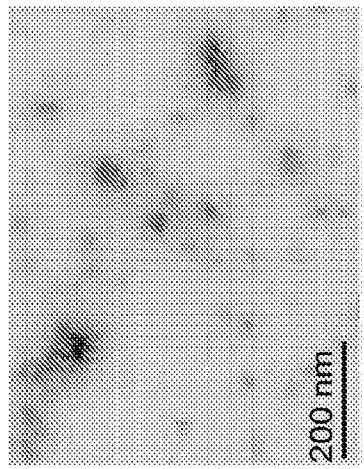
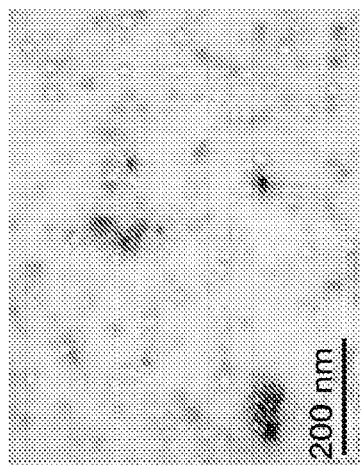
FIG. 5A
FIG. 5B

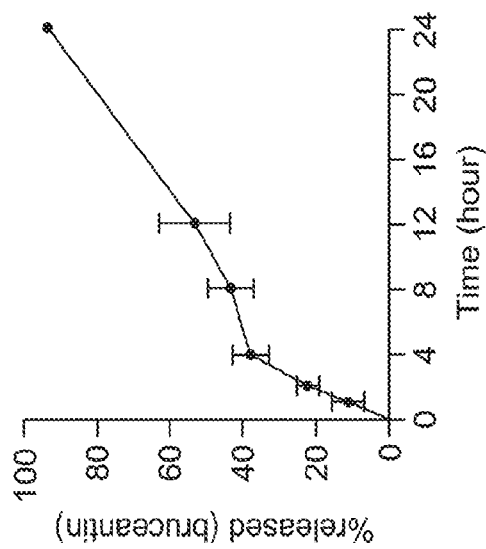
FIG. 5C
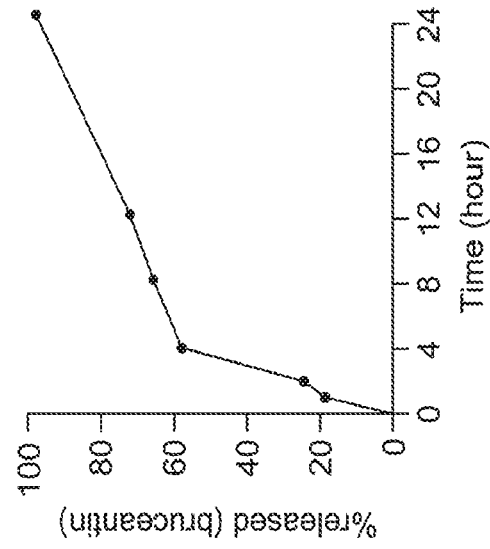
FIG. 5D
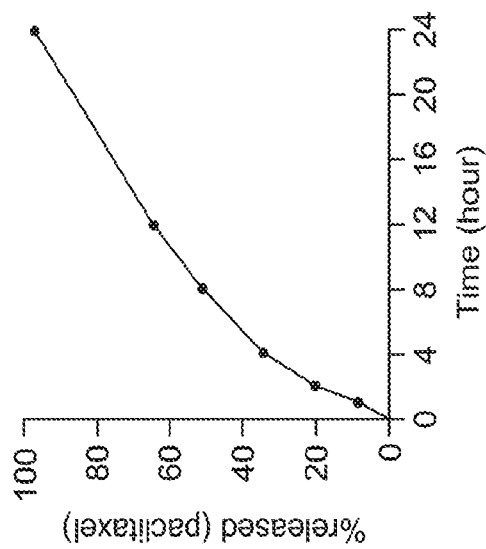
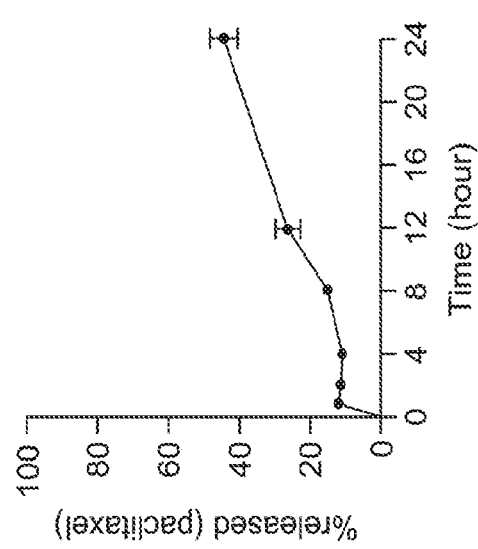

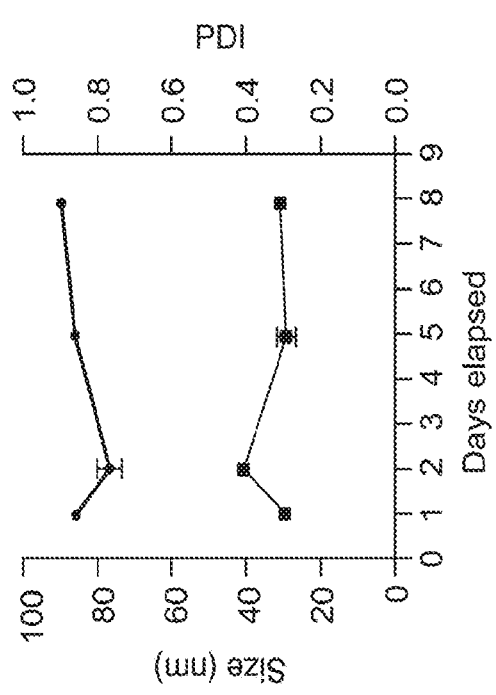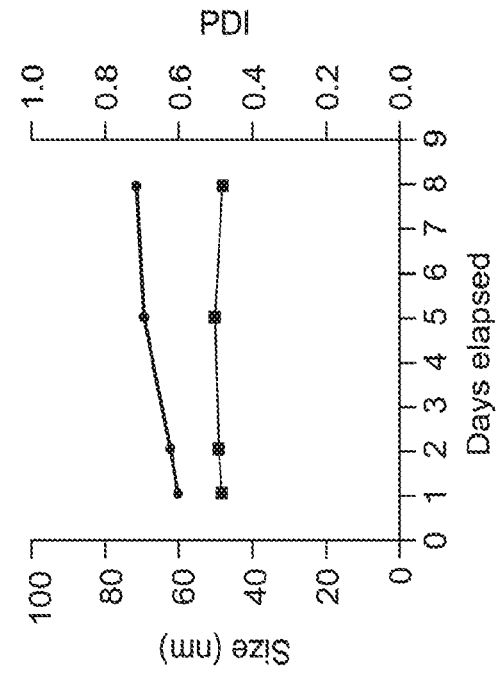
FIG. 5E
FIG. 5F
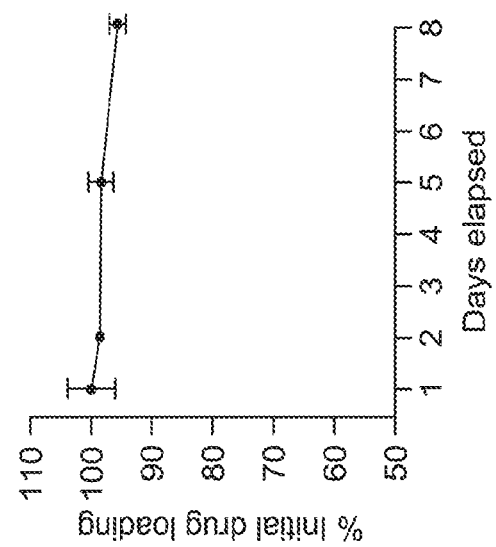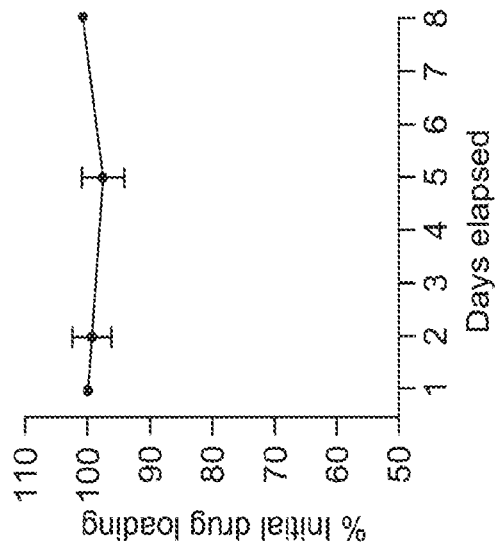

| Drug | MW (g/mol) | LC % (P2) | LC % (PMeOx-PcBOx) | EDA | HBA | HBD | LogP | RBN | score |
|---|---|---|---|---|---|---|---|---|---|
| Bruceantin | 548.59 | 50.0 | 15.7 | - | 8 | 3 | 1.4 | 6 | 4 |
| Paclitaxel | 853.91 | 40.7 | 6.2 | + | 9 | 3 | 4 | 14 | 4 |
| LY2109761 | 441.52 | 14.0 | 22.3 | + | 7 | 0 | 2.8 | 6 | 4 |
| Aclacinomycin A | 811.86 | 4.6 | 6.8 | + | 15 | 4 | 2.2 | 10 | 5 |
| GW788388 | 425.48 | 1.3 | 0.2 | + | 6 | 2 | 3.8 | 6 | 2 |
| LY364947 | 272.30 | 1.2 | 0.3 | + | 3 | 1 | 4.6 | 2 | 1 |
| GDC-0941 | 513.64 | 1.0 | 4.3 | + | 9 | 1 | 2 | 4 | 3 |
| Wortmannin | 428.44 | 1.0 | 3.8 | + | 6 | 0 | 0 | 4 | 2 |
| Imiquimod | 240.30 | 0.6 | 13.6 | - | 4 | 1 | 2.8 | 2 | 1 |
| SN-38 | 392.40 | 0.0 | 0.0 | - | 5 | 2 | 1.9 | 2 | 1 |

FIG. 6B

DRUG DELIVERY COMPOSITIONS AND APPLICATIONS THEREOF

RELATED APPLICATION DATA

This application is a U.S. National Phase of PCT/US2020/038711, filed Jun. 19, 2020, which claims priority pursuant to Article 8 of the Patent Cooperation Treaty to U.S. Provisional Patent Application Ser. No. 62/864,643, filed Jun. 21, 2019, each of which is incorporated herein by reference in its entirety.

FIELD

The present invention relates to compositions for drug delivery and, in particular, to compositions for delivery of poorly water soluble or water insoluble compounds.

BACKGROUND

With an increasing number of approved drugs, the design of novel drug molecules has become more complicated. The challenge in drug design is the concurrent demand for achieving higher therapeutic potency with proper physico-chemical properties and lower toxicity. Large pharmaceutical companies employ high throughput screening (HTS) to find lead compounds, but the structure optimization that takes place after HTS often results in therapeutic failure. It is well known that the increased structural complexity of therapeutic compounds is positively correlated to drug development success rate. Therefore, the use of additional strategies, such as rational drug design, is a necessity to help simplify this complex, failure-prone process. One potential approach to simplify drug development is to take advantage of drug delivery systems. Drug delivery systems can expand the design space of pharmaceutical molecules by compensating for undesirable physicochemical properties of therapeutic agents and modulating their pharmacokinetics, biodistribution, and cellular uptake.

SUMMARY

In one aspect, amphiphilic block copolymers are described herein comprising a first block and a second block, the second block including monomer having a side chain comprising a heteroaryl moiety, wherein the second block is more hydrophobic than the first block. In some embodiments, the heteroaryl moiety is a five-membered ring or six membered ring. Moreover, in some embodiments, the heteroatoms can be selected from the group consisting of nitrogen, oxygen, and sulfur. Additionally, in some embodiments, the heteroaryl moiety is of the formula:

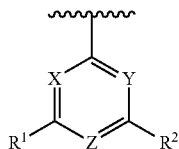

wherein X, Y and Z are heteroatoms independently selected from the group consisting of N, O, and S, and $R^1$ and $R^2$ are independently selected from the group consisting of hydrogen, alkyl, cycloalkyl, alkenyl, aryl, heteroaryl, amine, —SH, hydroxyl, halo, carboxyl, and —$CONR^3$, wherein $R^3$ is alkyl and ∿∿∿ represents a point of attachment of the heteroaryl moiety to the monomer.

In another aspect, compositions comprising micelles are described herein. A composition, in some embodiments, comprises micelles formed of amphiphilic block copolymer including a first block and a second block, the second block including monomer having a side chain comprising a heteroaryl moiety, wherein the second block is more hydrophobic than the first block. The micelles can contain one or more compounds, including compounds exhibiting pharmacological or therapeutic activity. In some embodiments, for example, compounds contained in micelles described herein are poorly water soluble or water insoluble.

In another aspect, methods of treatment are described herein. Briefly, a method of treatment, in some embodiments, comprises administering a micellar composition to a patient to treat one or more disorders of the patient, the micellar composition comprising one or more compounds carried by micelles, the micelles formed of amphiphilic block copolymer including a first block and a second block, the second block including monomer having a side chain comprising a heteroaryl moiety, wherein the second block is more hydrophobic than the first block.

In a further aspect, methods of forming composite compositions are described herein. A method of forming a composite composition comprises mixing one or more compounds with amphiphilic block copolymer, and forming an aggregate comprising the one or more compounds and the amphiphilic block copolymer, wherein the amphiphilic block copolymer includes a first block and a second block, the second block including monomer having a side chain comprising a heteroaryl moiety, and the second block is more hydrophobic than the first block.

These and other embodiments are described further in the following detailed description.

BRIEF DESCRIPTION OF THE DRAWINGS

FIG. 3B provides acid-base titration curves (left) and derivative plot dOH/dpH as a function of pH (right) of PMeOx-PcBOx, cBG, PMeOx-PMestOx and saline.

FIG. 3C are transmission electron microscopy images (TEM) of self-assembled PMeOx-PcBOx. Scale bar=200 nm (left), 50 nm (right).

FIGS. 5A and 5B are TEM images of the Paclitaxel-PMeOx-PcBOx formulation and Bruceantin-PMeOx-PcBOx formulation, respectively.

FIG. 5C is the release profile of paclitaxel (left) and bruceantin (right) from PMeOx-PcBOx nanoparticle formulation.

FIG. 5D is the release profile of paclitaxel (left) and bruceantin (right) from P2 polymer.

FIG. 5E is the stability profile of the Paclitaxel-PMeOx-PcBOx formulation.

FIG. 5F is the stability profile of the Bruceantin-PMeOx-PcBOx formulation.

FIG. 6B provides a comparison of the maximal LC of each drug in PMeOx-PcBOx and P2 micelles with the molecular characteristics of these drugs.

FIG. 7A provides cytotoxicity and $IC_{50}$ values of PMeOx-PcBOx, DachPt-PMeOx-PcBOx and free oxaliplatin in 344SQ murine NSCLC cells.

FIG. 7B provides cytotoxicity and $IC_{50}$ values of PMeOx-PcBOx, DachPt-PMeOx-PcBOx and free oxaliplatin in MDA-MB-231 human breast cancer cells.

FIG. 8 illustrates an amphiphilic triblock copolymer according to some embodiments described herein.

DETAILED DESCRIPTION

Figure 1:
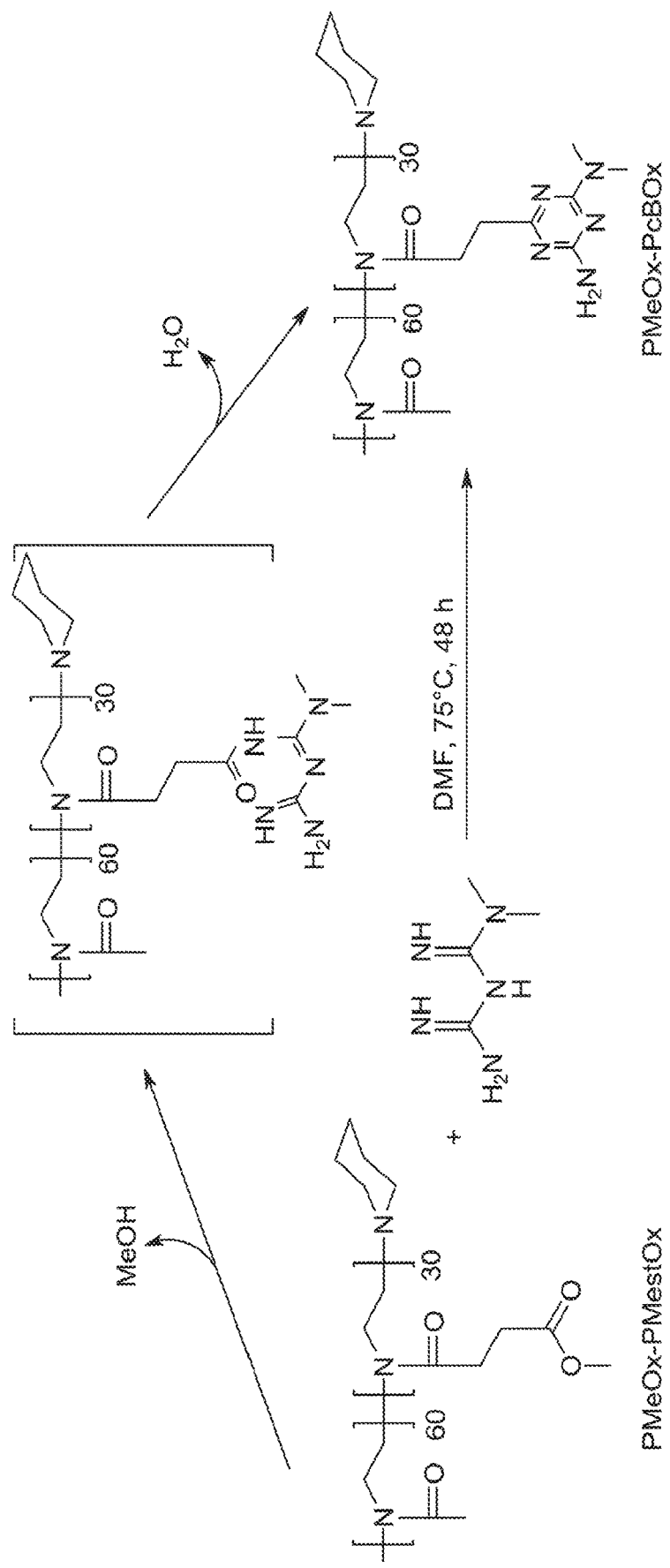
FIG. 1 illustrates a synthetic scheme for an amphiphilic block copolymer described herein, according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Definitions

The term "block copolymer" refers to conjugates of at least two different polymer segments, wherein each polymer segment comprises two or more adjacent units of the same kind. In other words, the term "block copolymer" is used herein in accordance with its established meaning in the art to refer to copolymers wherein repeating units of a defined type are organized in blocks, i.e., repeating units of the same type are polymerized sequentially adjacent to each other as opposed to, for example, sequences of randomly alternating repeating units of different types. In other words, the blocks of a block copolymer, such as blocks A and B to be further discussed below, represent polymeric entities themselves, obtained by the polymerization of monomers which are identical or which have certain common characteristics.

"Hydrophobic" designates a preference for apolar environments (e.g., a hydrophobic substance or moiety is more readily dissolved in or wetted by non-polar solvents, such as hydrocarbons, than by water).

"Hydrophilic" designates a preference of a substance or moiety for aqueous environments, i.e., a hydrophilic substance or moiety is more readily dissolved in or wetted by water than by non-polar solvents, such as hydrocarbons. In some embodiments, the term "hydrophilic" may mean the ability to dissolve in water.

As used herein, the term "amphiphilic" means the ability to dissolve in both water and lipids/apolar environments. Typically, an amphiphilic compound comprises a hydrophilic portion and a lipophilic (hydrophobic) portion. In other words, the term "amphiphilic" denotes the simultaneous presence of hydrophilic and less hydrophilic or more hydrophobic moieties in a compound, as frequently encountered in surfactants. To that extent, the copolymers used in the context of the invention are also referred to herein as amphiphilic copolymers since they comprise hydrophilic moieties and moieties which are less hydrophilic/more hydrophobic, respectively.

The term "alkyl" as used herein, alone or in combination, refers to a straight or branched saturated hydrocarbon group optionally substituted with one or more substituents. For example, an alkyl can be $C_1$-$C_{30}$ or $C_1$-$C_{18}$.

The term "alkenyl" as used herein, alone or in combination, refers to a straight or branched chain hydrocarbon group having at least one carbon-carbon double bond.

The term "cycloalkyl" as used herein, alone or in combination, refers to a non-aromatic, mono- or multicyclic ring system optionally substituted with one or more ring substituents.

The term "aryl" as used herein, alone or in combination, refers to an aromatic monocyclic or multicyclic ring system optionally substituted with one or more ring substituents.

The term "heteroaryl" as used herein, alone or in combination, refers to an aromatic monocyclic or multicyclic ring system in which one or more of the ring atoms is an element other than carbon, such as nitrogen, boron, oxygen and/or sulfur.

The term "heterocycle" as used herein, alone or in combination, refers to an mono- or multicyclic ring system in which one or more atoms of the ring system is an element other than carbon, such as boron, nitrogen, oxygen, and/or sulfur or phosphorus and wherein the ring system is optionally substituted with one or more ring substituents. The heterocyclic ring system may include aromatic and/or non-aromatic rings.

The term "alkoxy" as used herein, alone or in combination, refers to the moiety RO—, where R is alkyl, alkenyl, or aryl defined above.

The term "halo" as used herein, alone or in combination, refers to elements of Group VIIA of the Periodic Table (halogens). Depending on chemical environment, halo can be in a neutral or anionic state.

Terms not specifically defined herein are given their normal meaning in the art.

I. Amphiphilic Block Copolymers In one aspect, amphiphilic block copolymers are described herein comprising a first block and a second block, the second block including monomer having a side chain comprising a heteroaryl moiety, wherein the second block is more hydrophobic than the first block. In some embodiments, the heteroaryl moiety is a five-membered ring or six membered ring. Moreover, in some embodiments, the heteroatoms can be selected from the group consisting of nitrogen, oxygen, and sulfur.

Turning now to specific components, chemical identity the heteroaryl moiety of the second block can be selected according to several factors including, but not limited to, the desired hydrophobic character of the second block, desired electronic structure of the heteroaryl moiety, and/or specific identity of one or more compounds carried by micelles formed by the block copolymer. The heteroaryl moiety, for example, can be selected according to the ability form one or more interactions with compounds carried by micelles formed by the amphiphilic block copolymer. Such interaction can include hydrogen bonding, van der Walls interactions, and/or electronic structure interactions, such as pi-pi stacking interactions. In some embodiments, the heteroaryl moiety is of the formula (I).

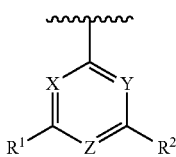

(I)

wherein X, Y and Z are heteroatoms independently selected from the group consisting of N, O, and S, and $R^1$ and $R^2$ are independently selected from the group consisting of hydrogen, alkyl, cycloalkyl, alkenyl, aryl, heteroaryl, amine, —SH, hydroxyl, halo, carboxyl, and —$CONR^3$, wherein $R^3$ is alkyl and ⌇⌇⌇ represents a point of attachment of the heteroaryl moiety to the monomer.

In some embodiments, X, Y and Z of the heteraryl moiety are nitrogen to provide a triazine structure. Additionally, $R^1$ and $R^2$ can be selected to further tune the character of the heteroaryl moiety. $R^1$ and $R^2$, for example, can be selected to increase or decrease interactions with compounds carried by micelles formed of the amphiphilic polymer. In some embodiments, $R^1$ and $R^2$ are independently selected from amine functional groups, including primary, secondary and/or tertiary amines. In some embodiments, the second block comprises polymer of the formula (Ia):

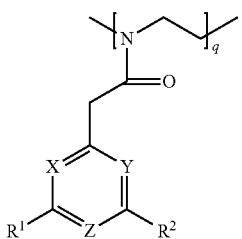

(Ia)

wherein q is at least 5. In some embodiments, q ranges from 10 to 100.

As described herein, the first block of the amphiphilic copolymer is more hydrophilic or less hydrophobic than the second block. The hydrophilic block can comprise any polymeric species not inconsistent with the technical objectives described herein. In some embodiments, the first block comprises poly(2-oxazoline), including 2-methyl-2-oxazoline, 2-ethyl-2-oxazoline, or combinations thereof. In other embodiments, the first block can comprise polyalkylene oxide, polyesters or polyamide. The first block, in some embodiments, is formed of a single polymeric species, such as poly(2-oxazoline) or other polymer exhibiting greater hydrophilic character relative to the second block. Alternatively, the first block can be formed of two or more polymeric species, such as poly(2-oxazoline) and polyalkylene oxide.

In some embodiments, the first block comprises polymer of the formula (II):

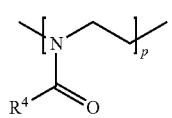

(II)

wherein $R^4$ is selected from the group consisting of alkyl, cycloalkyl and alkenyl, each optionally substituted with hydroxyl, —SH, —$COOR^5$, —$NR^6_2$, —$CONR^7$ or —CHO, wherein $R^5$-$R^7$ are independently selected from the group consisting of hydrogen and alkyl, and wherein p is at least 5. In some embodiments, p ranges from 10-300 or 20-200.

In some embodiments, amphiphilic block copolymer described herein is of the formula:

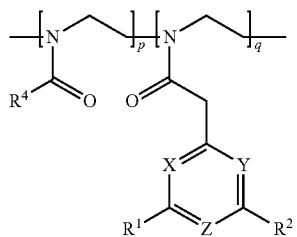

wherein $R^1$, $R^2$, $R^4$, X, Y, Z and p and q are described herein. Moreover, amphiphilic block copolymer described herein may also be for the formula:

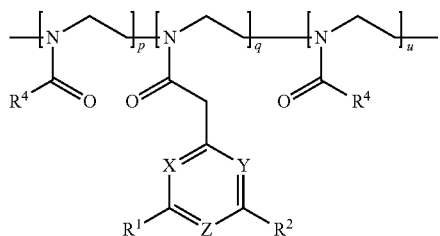

wherein $R^1$, $R^2$, $R^4$, X, Y, Z and p and q are described herein, and u ranges from 5-300.

Amphiphilic block copolymers having structure and properties described herein can have any desired ratio of repeating monomer between the first and second blocks. Number of repeating monomeric units in the first block relative to the second block can be selected according to several considerations, including specific chemical structure of the first and/or second blocks, the ability of the block copolymer to form micelles, and/or specific chemical identity of compound(s) to be carried by the micelles. In some embodiments, the ratio of repeating monomer between the first block and second block ranges from 10:1 to 1:2. The ratio of repeating monomer between the first block and the second block, for example, can range from 3:1 to 1:1.

As described herein, the second block is more hydrophobic than the first block. Hydrophobicity of the second block being greater than the first block may be readily apparent from the specific chemical structures constituting monomer of the first and second blocks. If necessary, i.e., if it is not readily apparent from the chemical structure that specific monomer of the second block is more hydrophobic than monomer of the first block, this can be verified, e.g., by preparing comparable homopolymers of the respective monomers and determining their log P value under the same conditions. The log P value, as commonly known, is the logarithm of the partition coefficient observed for a species A between water and n-octanol. In particular, the partition coefficient P of a species A is defined as the ratio $P=[A]_{n-octanol}/[A]_{water}$, wherein [A] indicates the concentration of A in the respective phase. The more hydrophilic substance will have higher concentrations in water. Typically, the volumes of water and octanol are the same for the measurement. Additionally, in some embodiments, the differences is hydrophobicity of the first and second blocks can be verified by determining critical micelle concentration (CMC) of the amphiphilic copolymer. If a CMC can be observed, the requirement of the more hydrophobic monomer of the second block and the more hydrophilic monomer of the first block is satisfied.

Amphiphilic copolymer, in some embodiments, can comprise other repeating units in addition to repeating units of formulas (Ia) and (II) above. However, in some embodiments the major portion of all repeating units, i.e., more than 50%, e.g., more than 75%, e.g., more than 90%, e.g., 100%, based on the total number of repeating units, are repeating units of formula (Ia) or (II) as defined above. It can be understood, in some embodiments, that all repeating units of formula (Ia) contained in the copolymer will be more hydrophobic than any of the repeating units of formula (II) contained in the copolymer.

Amphiphilic block copolymer described herein can have any desired block structure. Taking the first block as "A" and the second block as "B", the amphiphilic block copolymer can can be indicated as $(AB)_m$ or $(BA)_m$ with m being and integer from 1 to 10, or as ABA, or as BAB. In some embodiments the block copolymer is an AB or BA diblock copolymer or an ABA triblock copolymer.

In some embodiments, the polymeric entities of the block copolymer consist of (an) A block(s) consisting of polymerized 2-methyl-2-oxazoline or 2-ethyl-2-oxazoline (also referred to herein as "poly(2-methyl-2-oxazoline) block" or "poly(2-ethyl-2-oxazoline) block") and (a) B block(s) consisting of poly(2-N,N-dimethyl-1,3,5-triazine-2,4-diamine-6-ethyl-2-oxazoline). In certain embodiments the copolymer is an AB or ABA di- or triblock-copolymer of the above constitution.

The copolymers used in the context of the invention can be prepared by polymerization methods known in the art. For example, poly(2-oxazoline)s can be prepared by living cationic ring opening polymerization. Initiators used to generate the copolymers described herein can be any initiator used in the art. Additionally, the termini of the copolymers described herein can be any terminus known in the art. The polymers can be prepared from mono-, bi- or multifunctional initiators (such as multifunctional triflates or multifunctional oxazolines) such as, but not restricted to, methyltriflate, 1,2-bis(N-methyloxazolinium triflate) ethane or pentaerithritol tetrakistriflate. Examples of polymer termini include, for example, —OH, —OCH$_3$,

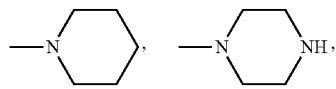

-continued

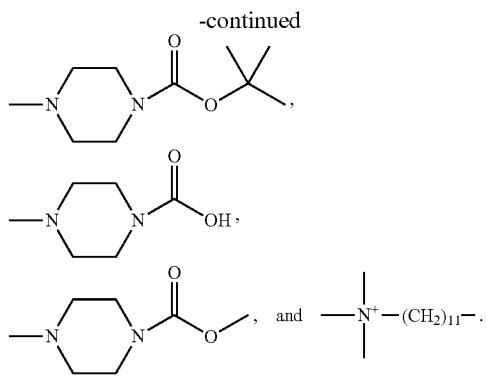

Amphiphilic copolymers described herein (e.g., piperazine terminated copolymers) may be additionally labeled with a fluorescent dye (e.g., fluorescein isothiocyanate, FITC) to allow evaluation of the localization (e.g., in plasma membrane compartments such as lipid rafts, caveolae, clathrin coated pits) of these polymers by confocal microscopy (Batrakova et al. (2001) *J. Pharmacol. Exp. Ther,* 299:483; Bonne et al. (2004) *Colloid Polym. Sci,* 282:833; Bonne et al. (2007) *Coll. Polym. Sci,* 285:491).

II. Micelles

In another aspect, compositions comprising micelles are provided. A composition, in some embodiments, comprises micelles formed of amphiphilic block copolymer including a first block and a second block, the second block including monomer having a side chain comprising a heteroaryl moiety, wherein the second block is more hydrophobic than the first block. Amphiphilic block copolymer forming micelles can have any composition, structure, and/or properties described in Section I hereinabove. Amphiphilic block copolymer of micelles, for example, can comprise a first block of formula (II) and a second block of formula (Ia), in some embodiments.

In some embodiments, micelles formed by the block polymers described herein may have CMCs which are less than 250 mg/L, particularly in the range from about 5 to about 150 or from about 5 to about 100 mg/L. Additionally, micelles can have sizes ranging from 5 nm to 500 nm or 10-100 nm, in some embodiments. Micelles, for example, can have size of 10 nm to 50 nm or 10 nm to 30 nm as determined by dynamic light scattering, which are particularly suitable for intravenous administration. Advantageously, the micelles can have narrow particle size distributions, exhibiting low polydispersity (PDI). In some embodiments, PDI of the micelles is less than 1.3 or less than 1. PDI of the micelles, for example, can be ≤0.5, ≤0.2 or even ≤0.1, in some embodiments.

As described herein, one or more compounds can be carried or contained by the micelles. The compounds, can be pharmaceutical compositions or therapeutic compositions, in some embodiments. Moreover, the compounds can be water insoluble. In being water insoluble, the compounds can exhibit solubility of less than 50 µg/mL or less than 10 µg/mL in water at a pH between 4 and 10 at 20° C.

Based on structure of the amphiphilic block copolymer, the micelles form in water or aqueous media. Thus, micellar compositions described herein may be formed by the thin film dissolution method, in some embodiments. In this method, the copolymer and compound are dissolved in a common solvent, such as acetonitrile or dimethylsulfoxide. After removal of the solvent (e.g., by a stream of inert gas, gentle heating and/or application of reduced pressure), films formed by the polymer and the compound can be easily dissolved in water or aqueous solutions and may be tempered at increased temperatures. When the films are dissolved, the micelles form. The stability of the micelles, in some embodiments, allows the resulting solutions to be dried to form a powder. For example, they can be freeze-dried, generally without the need for a cryoprotectant, and reconstituted in water or aqueous solutions without compromising loading capacities, particle integrity or particle sizes.

As a result of the use of the copolymers described herein, the compositions can form micelles soluble in water or aqueous solutions where they are stable for at least 12 h at room temperature and at elevated temperatures, especially at temperatures below 40° C., that allow for the parenteral administration of said compositions in animal in general and human in particular.

A weight ratio of one or more compounds in a micelle to weight of the amphiphilic block copolymer can be at least 1:9. In some embodiments, the weight ratio is at least 2:8, at least 3:7, or at least 4:6. The weight ratio may also be less than 4:5 or less than 1:1.

Additionally, amphiphilic block copolymers described herein can increase the solubility of hydrophobic compounds by a number of orders of magnitude using as little as 1% (w/w, i.e., 10 mg/mL) of the amphiphilic block copolymers in water or aqueous solutions. Extremely high loading capacities (loading capacity=(mass of hydrophobic compound)/(mass of polymer compound plus hydrophobic compound)×100%)) such as >30% (w/w), can be achieved. The high loading capacities at relatively low polymer concentration allow, in contrast to other commercialized systems, the preparation of formulations of low viscosity but high drug content. At the same time, there is a significant reduction in the amount of solubilizer subjects receive upon parenteral administration, thereby reducing the risk of adverse health effects.

Furthermore, amphiphilic block copolymers can exhibit a loading efficiency (i.e., (amount of solubilized compound/amount of initially charged compound)×100%) that can reach 100% and are generally found to be very high (>80%). This is a significant finding as high loading efficiencies are of importance for commercial applications for the reduction of production costs.

Due to the high solubilizing efficiency observed for the block copolymers described in Section I above, aqueous solutions can be made comprising compound concentrations, including pharmaceutical and/or therapeutic compound concentrations, ranging from as low as 1 mg/mL, e.g., 2 mg/mL, to concentrations of 100 mg/mL, e.g., to 50 mg/mL or 20 mg/mL. Since the copolymers are biocompatible, i.e., non-toxic, and undergo rapid renal clearance, high concentrations are not critical, but are generally not required. Compared to formulations of hydrophobic drugs currently on the market, this allows a significant reduction of the amount of solubilizer subjects receive upon parenteral administration of the drug, thus reducing the risk of adverse health effects.

Compounds contained by micelles formed by amphiphilic block copolymer described in Section I herein can be pharmaceutical agents or therapeutic agents, in some embodiments. Therapeutic agents, for example, can comprise peptides, peptoides, polyenes, macrocycles, glycosides, terpenes, terpenoids, aliphatic compounds, and aromatic compounds. In some embodiments, micelles described herein carry or contain a single compound. Alternatively, the micelles may carry or contain two or more compounds.

In some embodiments, the combination of compounds in a single micelle provides synergistic effects over each compound administered separately and even over each compound administered separately in the micelles.

In some embodiments, the ability to load more than one hydrophobic compound into the micelles permits the co-delivery of anticancer agents with agents that improve the therapeutic index of chemotherapy, such as chemosensitizers and/or tumor microenvironment (TME)-modifying compounds. These combinations may increase cancer cell cytotoxicity and/or modify the TME to enhance tumor control.

Examples of chemosensitizers include, without limitation, DNA repair inhibitors (e.g., wortmannin, KU55933, KU60019, CP46672, VE-822, AZD6738), PI3 kinase and AKT kinase inhibitors (e.g., AZD5363, LY294002, GDC-0941, KRX-0401, BAY 80-6946, INK1117, NVP-BEZ235), MTOR inhibitors (e.g., rapamycin, AZD2014, AZD8055), cell cycle check point inhibitors (e.g., AZD7762, AZD1775), and poly(ADP ribose) polymerase inhibitors.

Examples of TME modifiers include, without limitation, matrix metalloproteinase inhibitors (e.g., batimastat, marimastat, AZD1236), TGF-β inhibitors (e.g., GW788388, LY2109761, LY364947, SM-16), sonic hedgehog inhibitors (e.g., vismodegib, saridegib, cyclopamine), immune modulators (e.g., TLR agonists, imiquimod, resiquimod), and angiogenesis inhibitors (e.g., bevacizumab).

In one embodiment, a hydrophobic compound contained or carried by micelles is selected from one of the following groups: (i) VE-822, ABT-263, cisplatin prodrug (C6), podophyllotoxin, simvastatin; or (ii) AZD5363, AZD7762, AZD8055, cisplatin prodrugs (C10), (C8), (C4), LDN-57444, rutin, teniposide, tamibarotene, spironolactone; or (iii) KU55933, LY294002, LY294002 hydrochloride, olaparib, sabutoclax. In some embodiments, the composition comprises at least 1, 2, 3, 4, or more of the listed hydrophobic compounds.

In some embodiments, the hydrophobic compound carried by the micelles is at least two different hydrophobic compounds, one of which is selected from the group consisting of AZD7762, VE-822, KU55933, wortmannin, AZD8055, olaparib, imiquimod, NVP-BEZ235, LY294002, LY294002 hydrochloride, LY2109761, LDN-57444, AZD5363, LY364947, ABT-263, ABT-737, sabutoclax, brefeldin, and cisplatin prodrugs (C4), (C6), (C8), or (C10), and another selected from the group consisting of paclitaxel, etoposide, and VE-822. In some embodiments, the composition comprises at least 2, 3, 4, or more of the listed hydrophobic compounds.

As discussed herein, the amphiphilic block copolymers of Section I can be used to increase the solubility of active agents which are sparingly water soluble, e.g., hydrophobic active agents or non-water soluble active agents, in water or aqueous solutions, i.e., they can act as a solubilizer for these compounds.

As a result, in one embodiment, the compositions described further contain water to form an aqueous solution, emulsion or suspension, e.g., they are aqueous solutions of the hydrophobic compound and the copolymer. It will be understood that the term "solution" comprises, in this specific context, colloidal solutions as they may be formed by micelles in water. However, since the copolymers can allow the compositions to be lyophilized, in some embodiments, without compromising the activity and the stability of the active agent and without the need for a cryoprotectant, powders, especially lyophilized powders, form another embodiment of the compositions according to the invention. These powders may be conveniently reconstituted in water or aqueous solutions.

In some embodiments, aggregation of the amphiphilic copolymer occurs for carrying or containing one or more compounds described herein. In such embodiments, the aggregates may or may not resemble micelle structures. Aggregates of amphiphilic block copolymer can exhibit any of the properties of micelles described in this section including, but not limited to, size, PDI, compound loading, and compound loading efficiencies.

Thus, the polymers described herein can serve, e.g., as a versatile high capacity drug delivery system even for hydrophobic and structurally diverse drugs such as those listed above.

III. Methods of Treatment

In another aspect, methods of treatment are described herein. A method of treatment, in some embodiments, comprises administering a micellar composition to a patient to treat one or more disorders of the patient, the micellar composition comprising one or more compounds carried by micelles, the micelles formed of amphiphilic block copolymer including a first block and a second block, the second block including monomer having a side chain comprising a heteroaryl moiety, wherein the second block is more hydrophobic than the first block. Micelles of the composition can have any composition and/or properties described in Section II above. Similarly, amphiphilic block copolymer forming the micelles can have any composition and/or properties described in Section I above.

These and other embodiments are further illustrated in the following non-limiting examples.

Example 1—Amphiphilic Block Copolymer

PMeOx-PMestOx diblock copolymer was synthesized as the starting material via living cationic ring-opening polymerization and then converted it to N,N-dimethylbiguanide derivative by the polymer analogous condensation reaction of the MestOx block with N,N-dimethylbiguanide (FIG. 1). The full conversion of PMestOx was confirmed by $^1$H NMR spectra ($^1$H NMR (CDCl$_3$, 298 K)) of the reaction mixture as the methyl ester signal of the polymer (at δ 3.5 ppm) disappeared after the condensation with N,N-dimethylbiguanide. The block length and the molecular weight of the PMeOx-PMestOx precursor were confirmed via $^1$H NMR spectroscopy (H NMR (D$_2$O, 298 K)) (PMeOx=60, PMestOx=30, Mn=9.9 kg/mol) and gel permeation chromatography (Mn=13.4 kg/mol, PDI=1.038).

Figure 2A:
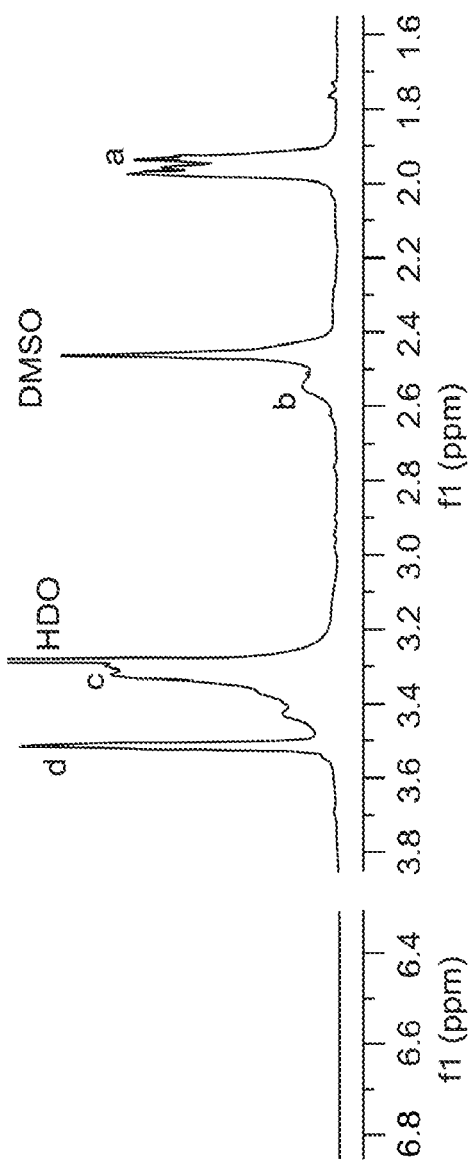
FIGS. 2A-2C illustrate an overlay of $^1$H NMR spectra of PMeOx-PMestOx, cBG and PMeOx-PcBOx respectively.
Figure 2A:
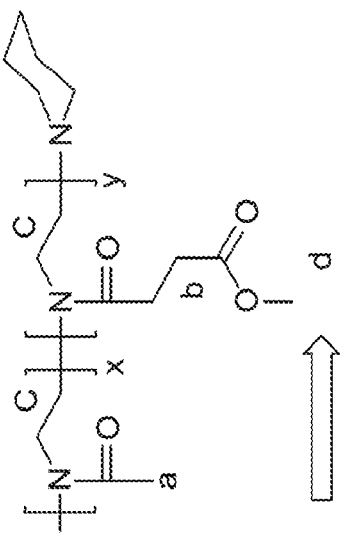
Figure 2B:
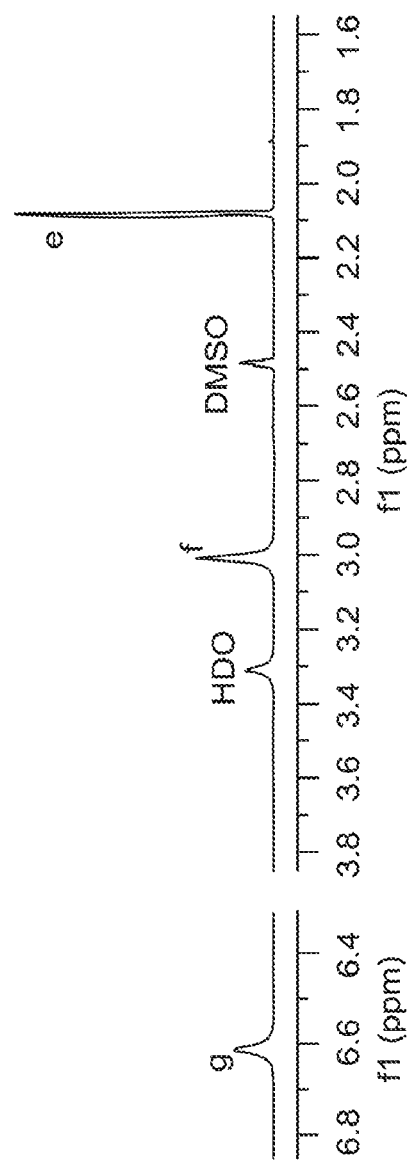
Figure 2B:
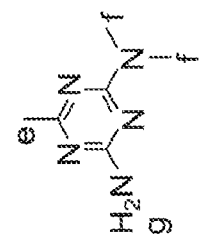
Figure 2C:
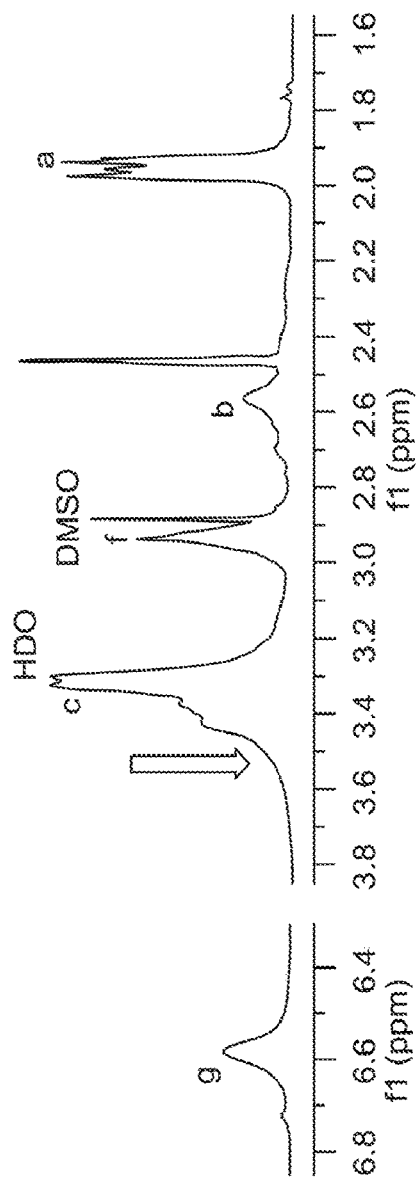

After the purification of PMeOx-PcBOx, $^1$H NMR spectrum of precursor (PMeOx-PMestOx), cBG, and PMeOx-PcBOx were analyzed to confirm the conversion of cBOx structure ($^1$H NMR ((CD$_3$)$_2$SO, 298 K)). The disappearance of the methyl ester signal (marked by arrow in FIG. 2A and not present in FIG. 2C) suggests that there was a complete conversion from methyl ester to a new structure. The $^1$H NMR spectrum of the newly synthesized side chain was nearly identical to that of the reference molecule (cBG) (FIGS. 2B and 2C) indicating that the condensed cBG-like ring structure was formed on the side chain of the polymer, consistent with PcBOx. Also, new peaks attributed to protons g and f appeared at 3.0 ppm and 6.6 ppm, respectively. There were no changes exhibited in the NMR spectrum of the other polymer block (PMeOx) (FIGS. 2A and 2C, proton a). This suggests the conversion of PMeOx-PMestOx to PMeOx-PcBOx was successful and proceeded without side reactions. The $^{13}$C NMR spectrum of PMeOx-PcBOx was also identical to that of the reference molecule (cBG) indicating the formation of cBG structure on the side chain of the polymer and the disappearance of the methyl ester signal (51 ppm) suggests a complete conversion from methyl ester to cBG structure. Also, new peaks attributed to four carbons appeared at 36 ppm, 165.4 ppm, 168.8 ppm, and 176.5 ppm. There were no changes exhibited in the NMR spectrum of the other polymer block (PMeOx).

Figure 3A:
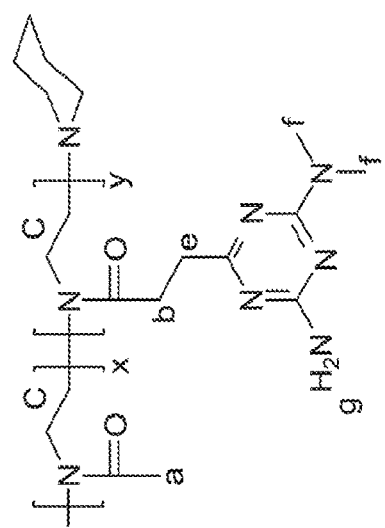
FIG. 3A provides UV spectra of PMeOx-PcBOx, cBG, PMeOx-PMestOx and N,N-dimethylbiguanide in the range of 200-300 nm.
Figure 3A:
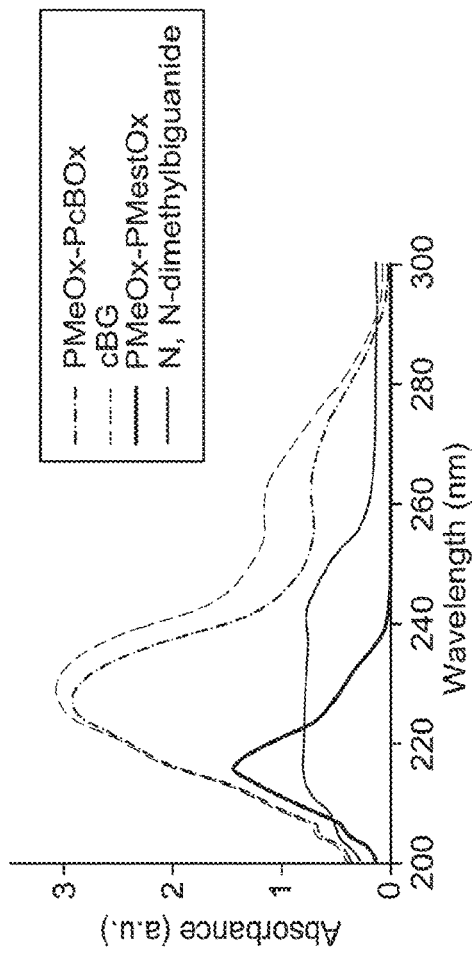

UV-Vis spectroscopic analysis was performed to investigate the formation of the PMeOx-PcBOx structure. As shown in FIG. 3A, the UV spectrum of the PMeOx-PcBOx showed specific peak absorbance around 227 nm while uncondensed N, N-dimethylbiguanide did not show particular UV absorbance. PMeOx-PcBOx exhibited a clear peak absorbance around 227 nm (PMeOx-PcBOx) confirming the formation of the PcBOx structure. These results suggest the methyl ester group in PMestOx had been condensed with N,N-dimethylbiguanide to form PcBOx. The PMeOx-PcBOx and cBG UV measurements were conducted with equimolar amounts of cBG molecules and PcBOX side chains, meaning nearly identical absorbance would be expected, which is seen in FIG. 3A. This, along with the NMR data, indicate a full conversion of the PMestOx unit to PcBOx.

To show the mass shift of PMestOx unit after conjugation with N,N-dimethylbiguanide, MALDI-TOF analysis was performed on PcBOx homopolymer with DP of 10. MALDI-TOF MS of the PMestOx revealed the expected spacing of 157.07 m/z corresponding to the MestOx monomer, while after the condensation reaction the spacing increased to 236.14 m/z. This data provides evidence supporting the condensation of N,N-dimethylbiguanide with PMestOx yielding the PcBOx structure (spacing of 236.14 m/z corresponding to repeating unit of PcBOx). The pH-dependent protonation of PMeOx-PcBOx polymer in saline was evaluated by titration (FIG. 3B). The titration curve and dOH/dpH curve of cBG clearly showed its proton buffering profile and its pKa was estimated to be around 5. PMeOx-PcBOx copolymer also had similar but broader protonation profile, whereas PMeOx-PMestOx didn't show any proton buffering capacity. This indicates the protonation profile of PMeOx-PcBOx was derived from the cBG moiety.

Example 2—Micelle Formation from Amphiphilic Block Copolymer

Self-assembly of PMeOx-PcBOx copolymer and formation of particles in aqueous media was investigated by DLS and confirmed by TEM. The particles had a volume measured diameter of 28.0 nm and PDI of 0.28 as determined by DLS. The particles were non-spherical, with partially elongated morphology (FIG. 3C). The dual spherical and elongated morphologies contribute to the high PDI value in the DLS measurements.

To confirm the molecular interaction among PMeOx-PcBOx in aqueous media, two dimensional Nuclear Overhauser Effect Spectroscopy (2D NOESY) NMR measurements were conducted. In the spectra of 2D NOESY NMR, PMeOx-PcBOx particles show strong correlation of PcBOx protons (2.6 ppm to 3.0 ppm, 6H, C$_3$N$_3$(NH$_2$)(N(CH$_3$)$_2$) with other PcBOx protons (2.2 ppm to 2.7 ppm, 4H, CO—CH$_2$—CH$_2$—C$_3$N$_3$(NH$_2$)(N(CH$_3$)$_2$) and protons of the polymer backbone (3.1 ppm to 3.7 ppm, 3.1-3.7 (4H, —N—CH$_2$—CH$_2$—). This highlights some of the intramolecular and intermolecular interactions present in the PMeOx-PcBOx polymer. In the case of PMeOx-PMestOx, 2D NOESY NMR did not show any correlation of protons of PMeOx-PMestOx. Taken together, this evidence supports that the molecular interaction of PMeOx-PcBOx arises from PcBOx structure and contributes to the polymer self-assembly into particles in aqueous media.

To investigate the effect of polymer concentration on the formation of the particle in aqueous solution, the CMC of PMeOx-PcBOx was determined by DLS. Light scattering intensity and count rate of the particle was monitored over a range of PMeOx-PcBOx concentrations and the point where derived count rate becomes constant corresponds to the CMC. The CMC of PMeOx-PcBOx was approximately 40 mg/L in DI water.

Example 3—Solubilization of Poorly Soluble Small Molecules

Figure 4:
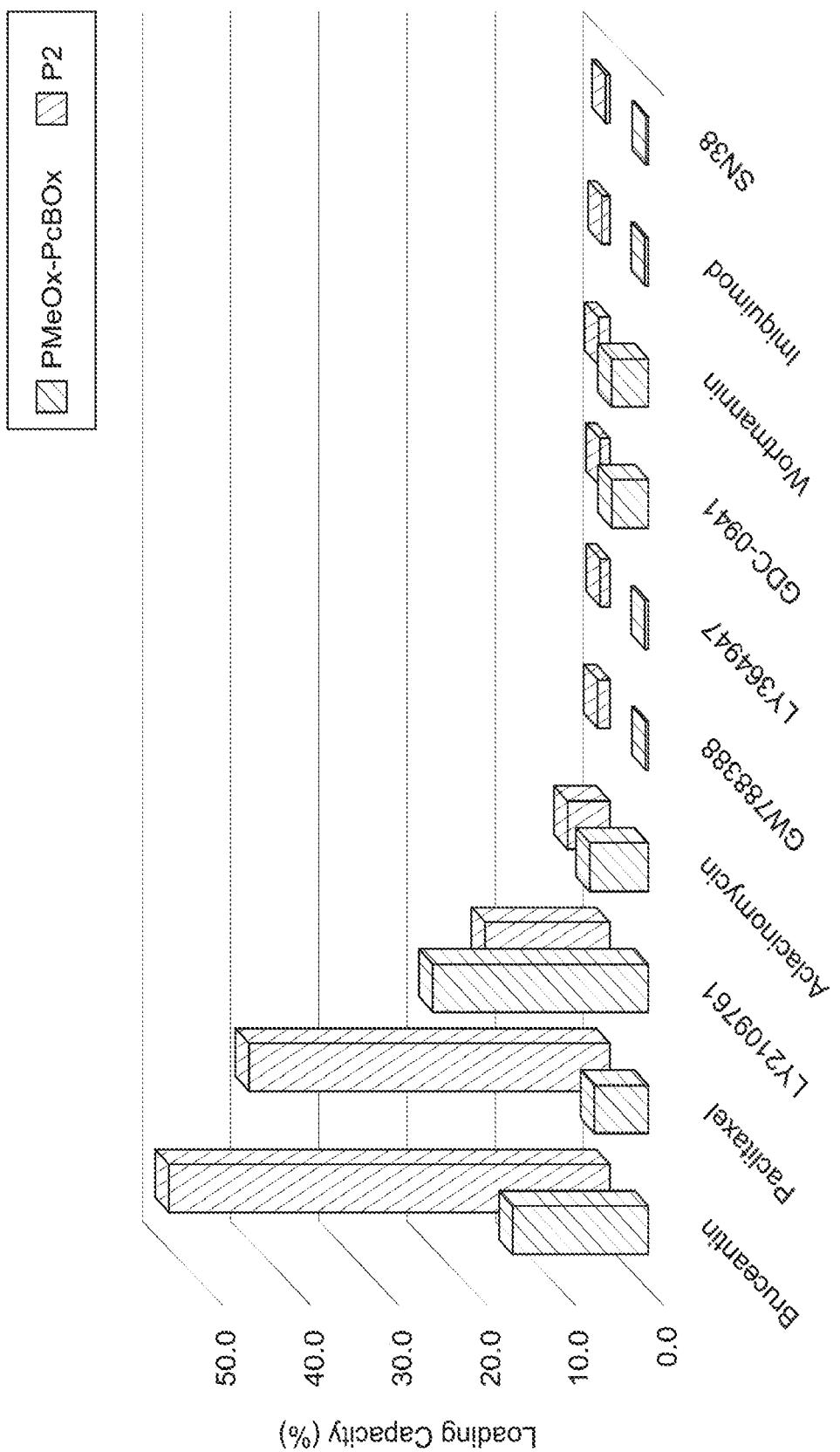
FIG. 4 illustrates differential solubilization of drugs indicated by the maximum LC in PMeOx-PcBOx (light gray bars) and P2 (dark gray bars), according to some embodiments.

Several poorly soluble active pharmaceutical ingredients were investigated to assess their solubilization in PMeOx-PcBOx polymeric micelles and compared it with the solubilization of these molecules in the micelles of our reference polymer P[MeOx$_{35}$-b-BuOx$_{20}$-b-MeOx$_{35}$] (P2). The molecules examined belonged to different classes including transforming growth factor β (TGF-β) receptor inhibitors (LY2109761, GW788388 and LY364947), protein synthesis inhibitors (bruceantin), toll-like receptor (TLR) 7 agonist (imiquimod), phosphatidylinositol 3-kinase (PI3K) inhibitors (wortmannin and pictilisib (GDC-0941)), microtubule inhibitor (paclitaxel), and topoisomerase inhibitors (Aclacinomycin A and SN-38). In these experiments, the polymer concentration was kept constant at 10 mg/ml and varied the feed concentration of the drug until its maximal solubility was observed. Drugs were screened at various ratios, beginning at 1:10 (drug:polymer), and increased the ratio until maximal solubility was obtained. As shown in FIG. 4, PMeOx-PcBOx micelle formulation displayed a reasonably good capacity for solubilization of several poorly soluble drug compounds. In particular, nearly ~3.28 mg/mL of LY2109761 was solubilized with 24.7% LC and little if any drug precipitate (82% LE). Bruceantin also showed reasonably good maximal solubilization in this formulation: 1.87 mg/ml, 11.5% LC, 65% LE. On the other hand, paclitaxel and other drugs were not as soluble as LY209761 and bruceantin (6.8% LC for aclacinomycin A, 6.3% LC for paclitaxel, 4.3% LC for GDC-0941, 3.8% LC for wortmannin), while LY364947 (0.3% LC) GW788388 (0.2% LC), Imiquimod (undetectable) and SN-38 (undetectable) were practically insoluble. Comparison of the solubilization profile of these molecules for PMeOx-PcBOx and P2 triblock copolymer micelles reveals distinct selectivity of each polymer for some of these APIs (FIG. 4). With P2, the ultra-high loading of bruceantin was observed with least amount of drug precipitate (as much as 9.98 mg/ml, 50.0% LC, 99% LE). Also, as previously reported, paclitaxel was solubilized at maximal concentration of 6.89 mg/ml (41% LC and 86% LE). LY2109761 showed fairly high solubilization in P2 micelles (1.5 mg/ml, 14.0% LC, 78% LE) although it was distinctively less than that observed in PMeOx-PcBOx micelles. Solubilization of aclacinomycin A was low but generally comparable in both micelle systems. On the other hand, GDC-0941 and wortmannin were practically insoluble in P2 system, while they were distinctively more soluble in PMeOx-PcBOx. The other compounds tested (GDC-0941, LY364947, SN-38, and Imiquimod) were practically insoluble in both micelle solutions.

Example 4—Micelle Encapsulation and Release of Pharmaceuticals

PMeOx-PcBOx micelle formulations displayed sub-100 nm size distribution in DLS measurement; 85 nm for paclitaxel (PDI=0.298, Dv10=23.3 nm, Dv50=34.6 nm, Dv90=80.9 nm), 60 nm for bruceantin (PDI=0.48, Dv10=17.2 nm, Dv50=25.2 nm, Dv90=42.9 nm), and 50 nm for LY2109761 (PDI=0.4, Dv10=15.5 nm, Dv50=21.5 nm, Dv90=34.8 nm). TEM images of both formulations are shown in FIGS. 5A and 5B and small-sized particles (approximately 30 nm) were observed in both formulations, corresponding to the DLS measurement (volume-based). Small portions of particle aggregate were observed in both formulations and this may explain the relatively high value of PDI.

The release profile of encapsulated drugs (Paclitaxel and Bruceantin) in PMeOx-PcBOx was investigated. Both Paclitaxel and Bruceantin were continuously released from PMeOx-PcBOx nanoparticle, with over 80% of drugs being released at 24 hour time point (FIG. 5C). The release rates were similar for Bruceantin in both of the polymers. Interestingly, the release rate was very different for Paclitxael in P2 vs. PMeOx-PcBOx (FIG. 5D). After 24 hours, most of the PTX was released in PcBOx whereas not even 50% was released from P2. This kind of release data is consistent with previously published data at this low (10:1) polymer:drug feeding ratio. Both paclitaxel and Bruceantin formulation in PMeOx-PcBOx were proven stable for 8 days at 4° C. as the drug loading and size distribution were monitored (FIGS. 5E and 5F).

Figure 6A:
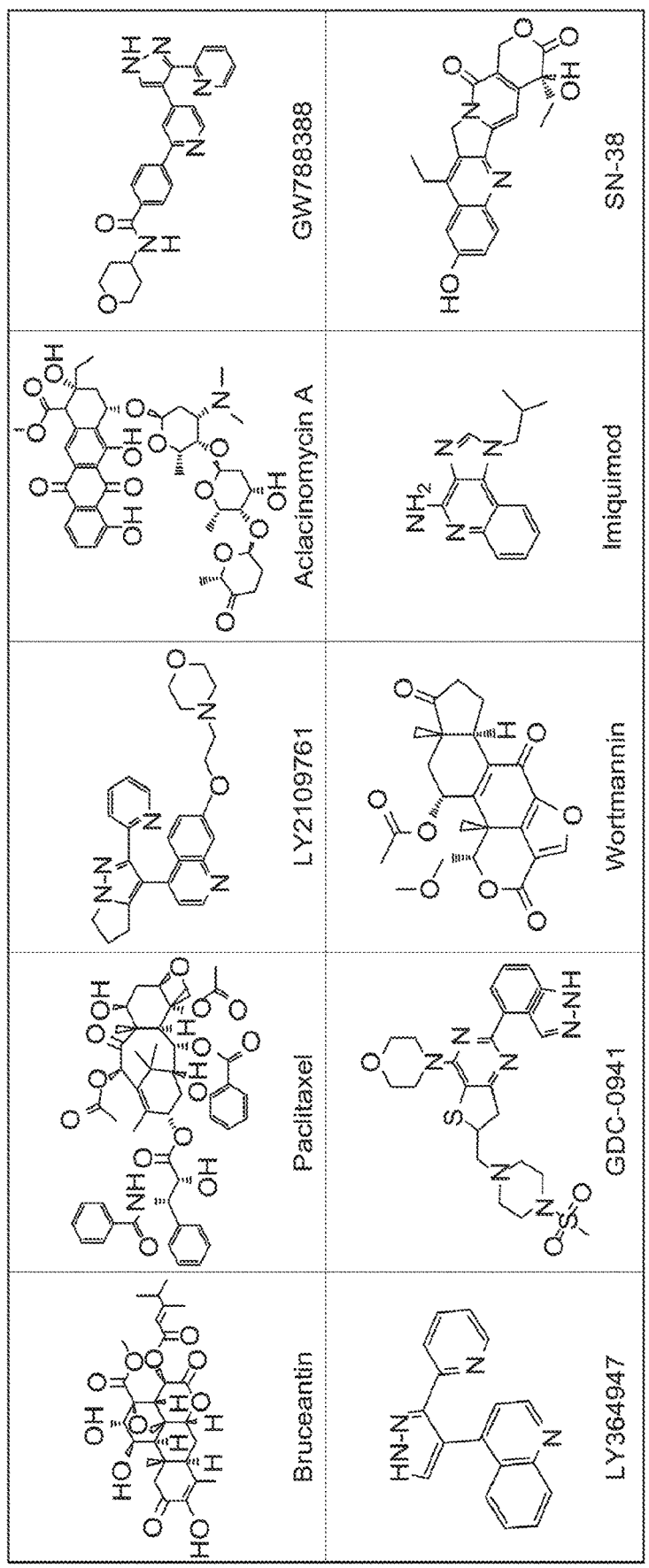
FIG. 6A illustrates evaluated drug structures in PMeOx-PcBOx and P2 micelles, according to some embodiments.

Finally, the relationship between LC and the physicochemical properties of the drug molecules that could be related to the interaction with PMeOx-PcBOx were summarized (FIG. 6). The designated potentially "influential" parameters are the presence of electron deficient aromatic structures (EDA), the numbers of hydrogen bonding acceptors (HBA) and donors (HBD), Log P, and the number of rotatable bonds (RBN).

Example 5—Micelles Encapsulating DachPt

It was investigated whether the cBG side chain of the PMeOx-PcBOx copolymer could facilitate incorporation of platinum drug (DachPt) in the polymeric micelles via coordination bonding. The loading was accomplished by co-incubation of the DachPt and PMeOx-PcBOx micelles in the aqueous solution followed by separation of the drug loaded micelles from unincorporated drug. The total platinum mass percent in the resulting DachPt-PMeOx-PcBOx formulation was about 17.7% as measured by ICP-MS. When converted to the equivalent content of DachPt this value results in ~34.5% LC. The analysis of DachPt-PMeOx-PcBOx formulation by DLS revealed a unimodal size distribution with an effective diameter of ~35 nm and PDI of 0.49. The increase of the particle size and polydispersity when compared to the free PMeOx-PcBOx micelles (~28 nm, PDI=0.28), was possibly due to conformational changes in the core-forming block and volume increase induced by DachtPt incorporation.

Example 6—In Vitro Cytotoxicity of DachPt-PMeOx-PcBOx Formulation

The in vitro cytotoxicity of DachPt-PMeOx-PcBOx was evaluated in comparison with the free oxaliplatin in 344SQ murine NSCLC cells and MDA-MB-231 human breast cancer cell lines. The cytotoxicity was measured by the CCK-8 assay. Free polymer PMeOx-PcBOx was found to be non-toxic in both cell lines up to 4 mg/mL dose. On the other hand, PMeOx-PcBOx-DachPt displayed platinum concentration-dependent cytotoxicity profile in both cell lines, albeit the corresponding its IC50 exceeded those of oxaliplatin by 10 to 50 times (FIGS. 7A and 7B). The present application details the development of an alternative polymer for drug nanoformulations which is compatible with drugs that cannot be otherwise formulated in existing drug delivery platforms. The previously studied hydrophobic PBuOx block in P2 (P[MeOx$_{35}$-b-BuOx$_{20}$-b-MeOx$_{35}$]) has polar and hydrated amide functionality in each repeating unit. While BuOx-based polymers, such as P2, have been extremely successful solubilizers for over two dozen drugs and drug candidates, there are many compounds which have failed to display equally good solubilization in this system. This has raised a necessity for the structural modification of the block copolymers to improve solubility of the otherwise failing to be formulated drugs.

A novel polymeric micelle platform with differential solubilizing capacity is described herein that could bring therapeutic advantages to a new array of insoluble drug compounds. A very different approach was employed to modification of the polymer hydrophobic block. Rather than adjusting the polymer backbone or adding a longer alkyl side chain, the alkyl side chain of PBuOx was completely replaced for a substituted aromatic heterocyclic ring. To validate this approach. a novel poly(2-oxazoline) diblock copolymer, PMeOx-PcBOx, was designed and synthesized with an N,N-dimethyl-1,3,5-triazine-2,4-diamine-6-ethyl side chain in the "hydrophobic block." The copolymer structure has been confirmed by the $^1$H NMR, 2D NOESY NMR, MALDI-TOF MS, and UV-Vis spectroscopic analysis. The copolymer demonstrated the ability to self-assemble into micelle-like structures.

Next, the drug loading capacity of this newly developed copolymer was evaluated. Drugs across the chemical space, including those molecules that have failed to be solubilized in P2 polymer, were used. For the selected drugs that were not well formulated in P2 micelles, such as LY2109761 (and Wortmannin and GDC-0941 to lesser extents), the new block copolymer displayed a good solubilization capacity superior to that of P2. Despite having lower hydrophobicity of the core-forming block than P2 (the estimated Log P value of cBOx is −0.27 while that of BuOx is 1.61), PMeOx-PcBOx can still solubilize a variety of drug compounds. Interestingly, all poorly soluble compounds that show reasonably good solubilization in PMeOx-PcBOx micelles (bruceantin and LY2109761) are moderately hydrophobic and have Log Ps of 1.4 and 2.8 respectively. At the same time the more hydrophobic compounds with Log P around 4 and above (including, paclitaxel) are less soluble or practically insoluble in these micelles.

The capability of N,N-dimethyl-1,3,5-triazine-2,4-diamine-6-ethyl side chain to engage in multiple interactions with the drug molecules is likely to be important for drug solubilization. In particular, N,N-dimethyl-1,3,5-triazine-2,4-diamine-6-ethyl has a three-heteroatom aromatic ring, which is highly electron deficient. It is known that electron-deficient aromatic rings can form stable pi-pi stacking dimers in part due to strong interactions between pi electrons and sigma electron-deficient orbitals. When considering this feature, N,N-dimethyl-1,3,5-triazine-2,4-diamine-6-ethyl groups may enable strong pi-pi stacking interactions both with each other, resulting in the self-assembly of the PcBOx blocks in the micelle core, and with drug molecules, some of which also have electron deficient aromatic rings. Indeed, of all the studied drugs, this new polymer has a clear "preference" for LY2109761, which has highly electron deficient aromatic rings.

Additionally, the N,N-dimethyl-1,3,5-triazine-2,4-diamine-6-ethyl side chain can serve as both a hydrogen bond acceptor and a hydrogen bond donor. Since hydrogen bond formation requires strict conformational angle and distance, the rigid 1,3,5-triazine ring may act as a molecular "scaffold" enabling efficient hydrogen bonding with selected drugs. At the same time, flexibility of the drug structure may be important for their ability to adjust the angles and distances necessary for maximal hydrogen bonding with the cBOx units. This may explain a tendency for better solubilization observed for some drugs having higher number of rotatable bonds. Interestingly, PMeOx-PcBOx micelles appeared to have solubilization preference for some of the compounds that have higher hydrogen bonding capacity and greater number of rotatable bonds, which is known to be detrimental for drug absorption into target cells. Thus, the new PMeOx-PcBOx block copolymer, and the overall class of poly(2-oxazolines) with side chains containing substituted aromatic heterocycles, may hold the potential to expand the design space of APIs and spark the development of novel polymeric micelle formulations based on multiple drug-polymer interactions.

While relying on different mechanisms for loading hydrophobic drugs, the micelles were still able to produce a similar release profile for Bruceantin. Additionally, for Paclitaxel, the PcBOx allowed access to a different, more complete, release profile at the given 1:10 drug to polymer ratio. Utilizing different block structures it is possible to tune the release profile of the polymeric micelles. This could be advantageous for tuning in vivo drug pharmacokinetic properties to reduce toxicity or increase therapeutic efficacy.

PMeOx-PcBOx micelles were also loaded with DachPt, which is an active form of the platinum chemotherapeutics, oxaliplatin and miriplatin. The resulting DachPt-PMeOx-PcBOx formulation displayed an anticancer activity in two different cancer cell lines, albeit in each cell line it had higher $IC_{50}$ values than oxaliplatin. This difference in $IC_{50}$ could be attributed to two factors; 1) the cell uptake mechanism is different between nanoparticle (DachPt-PMeOx-PcBOx) and small molecules (oxaliplatin), and 2) the onset of the cell damage is delayed for DachPt-PMeOx-PcBOx due to slower DachPt release mechanism compared to oxaliplatin that readily forms DachPt in cytosolic reducing conditions. Further investigation is warranted to elucidate the mechanism of DachPt release in physiological conditions and cell uptake of the DachPt-PMeOx-PcBOx formulation.

Platinum drugs are widely used chemotherapies of cancer, but are known to cause peripheral neuropathy, especially sensory ataxia, due to the accumulation in the dorsal root ganglion. To reduce this adverse effect, and maximize the therapeutic index, various delivery systems are explored for this drug class. More generally, metal nanoparticle systems are interesting subjects not just for therapeutics, but also for diagnostics and imaging especially in the field of oncology. For example, manganese (Mn) or gadolinium (Gd) containing nanoparticles can be used as MRI contrast agents and gold nanoparticles are known to be useful as CT contrast agents. Ruthenium (Ru) organometallic complexes were reported as photoluminescence imaging agents that can detect hypoxic tumors. While the new polymer class described in this work may not have applications in all these instances, it is truly remarkable that the same polymer excipient displays ability for incorporating both poorly soluble APIs as well as relatively well solubilized metal complexes used in chemotherapy.

Example 7—Amphiphilic Block Copolymer

Synthesis of Methyl-P[MeOx$_{40}$-b-MestOx$_{30}$-b-MeOx$_{40}$]-piperidine (PMeOx-PMestOx-PMeOx) Under dry and inert conditions, 32.2 mg (0.2 mmol, 1 eq) of initiator (MeOTf) and 676 mg (7.95 mmol, 40 eq) of MeOx monomer were dissolved in 4 mL dry acetonitrile at RT. The mixture was stirred at 80° C. for 4 h. After cooling to RT, the monomer for the second block, MestOx (942 mg, 6.01 mmol, 30 eq), was added and the mixture was stirred at 80° C. overnight. After cooling to RT, the monomer for the third block, MeOx (676 mg, 7.95 mmol, 40 eq), was added and the mixture was stirred at 80° C. overnight. The polymer was terminated by addition of 0.1 mL piperidine (1.01 mmol, 5 eq) and the mixture was stirred overnight at RT. An excess of K$_2$CO$_3$ was added to the mixture, and then the mixture was allowed to stir for 12 h. After filtration of the mixture, 5 mL of chloroform-methanol mixture (1:1) was added to the filtrate containing the product (PMeOx-PMestOx-PMeOx). After precipitation of the polymer by ice-cold diethyl ether (approximately 50 times the volume of polymer solution of diethyl ether was added), the product was isolated by centrifugation and organic solvent was decanted. The polymer product was dissolved in ~50 mL of DI water and dialyzed against DI water (3.5 kDa membrane) for 3 days, changing the water every day, to remove organic solvent and any remaining monomers. The resulting solution was lyophilized, and the polymer was obtained as a white powder (1428 mg, 73%). $^1$H NMR (D$_2$O, 298 K): 2.4-2.7 (4H, CO—CH$_2$—CH$_2$—CO—OCH$_3$); 3.2-3.7 (7H, —N—CH$_2$—CH$_2$, —COO—CH$_3$); 1.8-2.0 (3H, —CO—CH$_3$).

Synthesis of Methyl-P[MeOx$_{60}$-b-(2-N,N-dimethyl-1,3,5-triazine-2,4-diamine-6-ethyl-2-oxazoline)$_{30}$-b-MeOx$_{60}$]-piperidine (PMeOx-PcBOx-PMeOx)

N,N-dimethylbiguanide (Metformin) free base was prepared. Briefly, metformin hydrochloride (4.51 g, 27.27 mmol) was suspended in isopropyl alcohol (i-PrOH) (40 mL) and potassium hydroxide (1.83 g, 32.62 mmol) was added to the suspension at 50° C. The white slurry was stirred at 50° C. for 2 h, and then the mixture was cooled to RT. The resulting mixture was filtered and the filter-cake was washed with acetone (2×10 mL). The combined filtrates were concentrated under reduced pressure yielding a white solid (metformin free base). Yield: 98% (3.45 g); $^1$H NMR (400 MHz, D$_2$O) δ 3.07 (s, —N—(CH$_3$)$_2$). Subsequently, N,N-dimethylbiguanide free base (1.55 g, 12.02 mmol (20-fold excess amount of MestOx unit in polymer)) was added to a solution of PMeOx-PMestOx-PMeOx (230 mg, 20.0 μmol (0.6 mmol of total MestOx unit)) in dimethylformamide (DMF) (15 mL). The mixture was stirred at 75° C. for 48 h to form PcBOx. The reaction mixture was then diluted with DI water and dialyzed against DI water to completely remove unreacted free N,N-dimethylbiguanide and organic solvent. The polymer was obtained as a white powder after lyophilization from water. The full conversion of PMestOx to PcBOx was confirmed by $^1$H NMR spectra. $^1$H NMR (D$_2$O, 298 K): 2.2-2.7 (4H, CO—CH$_2$—CH$_2$—C$_3$N$_3$(NH$_2$)(N(CH$_3$)$_2$); 2.6-3.0 (6H, C$_3$N$_3$(NH$_2$)(N(CH$_3$)$_2$); 3.1-3.7 (4H, —N—CH$_2$—CH$_2$—); 1.8-2.0 (3H, —CO—CH$_3$) Structure of the polymer is illustrated in FIG. 8, wherein x=40, y=30, and z=40.

Example 8—Micelle Encapsulation of Water-Insoluble Drugs and In-Vitro Release Drug-encapsulated polymeric nanoparticle formulations were prepared by the thin film hydration method. For resiquimod, imiquimod, and RXDX-105, stock solutions of PMeOx-PcBOx-PMeOx and drugs in chloroform:methanol (9:1) solution were mixed together at the pre-determined ratios (8:10 drug to polymer w/w ratio (resiquimod), 2:10 w/w ratio (imiquimod), 4:10 w/w ratio (RXDX-105)). The organic solvent was evaporated at 58° C. under a stream of inert gas to form a thin-film of drug-polymer homogenous mixture. Next, the thin films were hydrated with saline and then incubated for 5-10 min to form drug-encapsulated polymeric micelle solutions. All samples were prepared with 1 mg of polymer and hydrated with 100 uL of saline. The formed micelle solutions were centrifuged at 10,000 rpm for 3 minutes (Sorvall Legend Micro 21R Centrifuge, Thermo Scientific) to remove any precipitate of unloaded drug or polymer. The final concentration of drugs in PMeOx-PcBOx-PMeOx micelles was analyzed by HPLC (Agilent Technologies 1200 series) using a mixture of acetonitrile/water (70%/30% v/v for Resiquimod and imiquimod; 50%/50% v/v for RXDX-105) as the mobile phase. The samples were diluted with mobile phase to final concentration of ~100 μg/mL of drugs and injected (10 μL) into the HPLC system. The flow rate was 1.0 mL/min, and column temperature was 40° C. Detection wavelength was 254 nm. Drug concentration was quantified against free drug calibration curves. Particle z-average effective diameter and polydispersity index (PDI) were measured by dynamic light scattering (DLS) (Nano-ZS, Malvern Instruments, UK).

The following equations were used to calculate LE and LC of drug in PMeOx-PcBOx micelles:

$$LC\ (\%) = M_{drug} / (M_{drug} - M_{excipient}) \times 100\%$$

Where $M_{drug}$ and $M_{excipient}$ are the mass of the solubilized drug and polymer in the solution respectively, while $M_{drug}$ added is the weight amount of the drug added to the dispersion during the preparation of the micelle formulation.

The molecules examined belonged to different classes including toll-like receptor (TLR) 7 agonist (imiquimod), toll-like receptor (TLR) 7 and 8 agonist (resiquimod), and RET/BRAF inhibitor (RXDX-105). In these experiments, the polymer concentration was kept constant at 10 mg/ml and varied the feed concentration of the drug until its maximal solubility was observed. As shown in Table 1, PMeOx-PcBOx (diblock copolymer) and PMeOx-PcBOx-PMeOx (triblock copolymer) micelle formulation displayed a reasonably good capacity for solubilization of several poorly soluble drug compounds.

TABLE 1

Loading capacity (LC %) and size distribution of API-loaded micelle formulations in a given amphiphilic block copolymer

| API | Polymer | $D_{eff}$ | PDI | LC (%) |
|---|---|---|---|---|
| Resiquimod | PcBOx diblock | 165 nm | 0.175 | 38.1 |
|  | PcBOx triblock | 184 nm | 0.214 | 40.7 |
| Imiquimod | PcBOx triblock | 160 nm | 0.18 | 14.1 |
| RXDX-105 | PcBOx triblock | 112 nm | 0.30 | 24.1 |

Resiquimod showed reasonably good maximal solubilization in these formulations: 38.1% LC for PMeOx-PcBOx and 40.7% LC for PMeOx-PcBOx-PMeOx. Also, resiquimod-loaded formulations had nano-sized size distribution under 200 nm in DLS measurement (165 nm (PDI=0.175) for PMeOx-PcBOx and 184 nm (PDI=0.214) for PMeOx-PcBOx-PMeOx). Other poorly soluble drugs (imiquimod and RXDX-105) were solubilized in PMeOx-PcBOx-PMeOx to form micelle formulation with good loading capacity: 24.1% LC for RXDX-105 and 14.1% LC for imiquimod. Imiquimod-loaded PMeOx-PcBOx-PMeOx micelle displayed sub-200 nm size distribution in DLS measurement; 160 nm for imiquimod (PDI=0.18) and 112 nm for RXDX-105 (PDI=0.30).

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An amphiphilic block copolymer comprising:
a first block and a second block, the second block including oxazoline monomer having a side chain comprising a heteroaryl moiety, wherein the second block is more hydrophobic than the first block, and the heteroaryl moiety is of the formula:

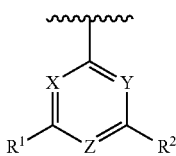

wherein X, Y and Z are heteroatoms independently selected from the group consisting of N, O, and S, and $R^1$ and $R^2$ are independently selected from the group consisting of hydrogen, alkyl, cycloalkyl, alkenyl, aryl, heteroaryl, amine, —SH, hydroxyl, halo, carboxyl, and —CONR$^3$ wherein $R^3$ is alkyl and ⌇⌇⌇ represents a point of attachment of the heteroaryl moiety to the monomer.

2. The amphiphilic block copolymer of claim 1, wherein the heteroaryl moiety comprises two or more heteroatoms.

3. The amphiphilic block copolymer of claim 2, wherein the heteroatoms are selected from the group consisting of nitrogen, oxygen, and sulfur.

4. The amphiphilic block copolymer of claim 1, wherein the heteroaryl moiety is a five-membered ring or six membered ring.

5. The amphiphilic block copolymer of claim 2, wherein the heteroaryl moiety comprises an azine.

6. The amphiphilic block copolymer of claim 1, wherein the second block comprises poly (2-N,N-dimethyl-1,3,5-triazine-2,4-diamine-6-ethyl-2-oxazoline).

7. The amphiphilic copolymer of claim 1, wherein the first block comprises a poly (2-oxazoline) or derivative thereof.

8. The amphiphilic block copolymer of claim 1, wherein the first block comprises polymer of the formula:

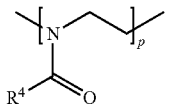

wherein $R^4$ is selected from the group consisting of alkyl, cycloalkyl and alkenyl, each optionally substituted with hydroxyl, —SH, —COOR$^5$, —NR$^6_2$, —CONR$^7$ or —CHO, wherein $R^5$-$R^7$ are independently selected from the group consisting of hydrogen and alkyl and wherein p is at least 5.

9. The amphiphilic block copolymer of claim 1 having a diblock structure.

10. The amphiphilic block copolymer of claim 1, wherein the first block is represented by A and the second block is represented by B, and having an ABA triblock structure.

11. An amphiphilic block copolymer comprising:
a first block and a second block, the second block including monomer having a side chain comprising a heteroaryl moiety, wherein the second block is more hydrophobic than the first block comprises poly (2-N,N-dimethyl-1,3,5-triazine-2,4-diamine-6-ethyl-2-oxazoline).

12. The amphiphilic block copolymer of claim 11, wherein the heteroaryl moiety comprises two or more heteroatoms.

13. The amphiphilic block copolymer of claim 12, wherein the heteroatoms are selected from the group consisting of nitrogen, oxygen, and sulfur.

14. The amphiphilic block copolymer of claim 11, wherein the heteroaryl moiety is a five-membered ring or six membered ring.

15. The amphiphilic block copolymer of claim 12, wherein the heteroaryl moiety comprises an azine.

16. The amphiphilic block copolymer of claim 11, wherein the heteroaryl moiety is of the formula:

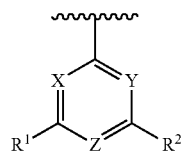

wherein X, Y and Z are heteroatoms independently selected from the group consisting of N, O, and S, and $R^1$ and $R^2$ are independently selected from the group consisting of hydrogen, alkyl, cycloalkyl, alkenyl, aryl, heteroaryl, amine, —SH, hydroxyl, halo, carboxyl, and —CONR$^3$, wherein $R^3$ is alkyl and ⌇⌇⌇ represents a point of attachment of the heteroaryl moiety to the monomer.

17. The amphiphilic copolymer of claim 11, wherein the first block comprises a poly (2-oxazoline) or derivative thereof.

18. The amphiphilic block copolymer of claim 11, wherein the first block comprises polymer of the formula:

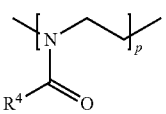

wherein $R^4$ is selected from the group consisting of alkyl, cycloalkyl and alkenyl, each optionally substituted with hydroxyl, —SH, —COOR$^5$, —NR$^6_2$, —CONR$^7$ or —CHO, wherein $R^5$-$R^7$ are independently selected from the group consisting of hydrogen and alkyl and wherein p is at least 5.

19. The amphiphilic block copolymer of claim 11 having a diblock structure.

20. The amphiphilic block copolymer of claim 11, wherein the first block is represented by A and the second block is represented by B, and having an ABA triblock structure.

* * * * *